United States Patent [19]
Kobayashi et al.

[11] Patent Number: 5,722,165
[45] Date of Patent: Mar. 3, 1998

[54] METHOD OF PRODUCING A CAST WHEEL

[75] Inventors: Shunji Kobayashi, Okazaki; Isao Tanaka, Yokohama; Saburo Maruyama; Kishiro Abe, both of Ayase, all of Japan

[73] Assignee: Topy Kogyo Kabushiki Kaisha, Tokyo, Japan

[21] Appl. No.: 735,988

[22] Filed: Oct. 25, 1996

[30] Foreign Application Priority Data

Oct. 27, 1995 [JP] Japan .................................. 7-280271

[51] Int. Cl.$^6$ ............................................. B21H 1/02
[52] U.S. Cl. .......................... 29/894.325; 29/894.32; 29/90.7
[58] Field of Search ..................... 29/894.325, 90.7, 29/894.3, 894.32; 301/65; 72/53

[56] References Cited

U.S. PATENT DOCUMENTS 4,228,671 10/1980 Skeen .................................. 29/894.325
4,821,388 4/1989 Okumura et al. ..................... 29/894.325

Primary Examiner—P. W. Echols
Attorney, Agent, or Firm—Cushman, Darby & Cushman IP Group of Pillsbury Madison & Sutro LLP

[57] ABSTRACT

In a method for producing a cast aluminum wheel, a cast aluminum wheel is produced, and then all of three strengthening processes are applied to the cast aluminum wheel. The three strengthening processes include forging a portion of the cast wheel between adjacent boltholes, burnishing a nut seat of the cast wheel, and shot blasting a hub coupling surface of the cast wheel.

7 Claims, 3 Drawing Sheets

METHOD OF PRODUCING A CAST WHEEL

This application is based on application no. HEI 7-280271 filed in Japan on Oct. 27, 1995, the content of which is incorporated hereinto by reference.

BACKGROUND OF THE INVENTION

1. Field of the Invention

The present invention relates to a method for producing a cast wheel for a truck and/or a bus.

2. Description of Related Art

Aluminum wheels for trucks and buses are produced in Japan by forging only, to satisfy a fatigue strength standard therefor. Casting has not been used for producing aluminum truck and bus wheels.

In contrast, for aluminum wheels for a sedan, cast wheels are used. Even in the case of cast wheels for a sedan, a single kind of strengthening process, that is, either burnishing a nut seat or shot blasting a hub coupling surface has been applied.

Recently, a demand for producing aluminum wheels for trucks or buses by casting has increased in order to increase a freedom of design and to lighten the wheel.

SUMMARY OF THE INVENTION

An object of the present invention is to provide a method for producing a cast aluminum wheel for a truck and/or a bus which is improved in a fatigue strength so as to satisfy the strength standard.

A method for producing a cast aluminum wheel according to the present invention includes the steps of casting an aluminum wheel, and applying all of three kinds of strengthening processes to the cast wheel to thereby increase a fatigue strength of the wheel. The three kinds of strengthening processes include forging a portion of the wheel between adjacent boltholes, shot blasting a hub coupling surface (a surface where the wheel is coupled to a hub), and burnishing a nut seat. These three processes may be applied to the wheel in any order.

By applying the three kinds of strengthening processes to cast wheels which usually have various fatigue strengths, the fatigue strength of the cast wheels is increased and stabilized, so that a strength reliability of the wheels is improved. Further, when the three kinds of strengthening processes are applied, a greater increase in fatigue strength than a summation of increases in fatigue strength due to respective strengthening processes is seen, which means that a so-called synergism is obtained. As a result, the strength of the cast aluminum wheels for a large vehicle such as a truck or a bus is improved to satisfy the strength standard.

BRIEF DESCRIPTION OF THE DRAWINGS

The above and other objects, features, and advantages of the present invention will become more apparent and will be more readily appreciated from the following detailed description of the preferred embodiment of the present invention in conjunction with the accompanying drawings, in which.

DETAILED DESCRIPTION OF THE PREFERRED EMBODIMENT

Figure 5:
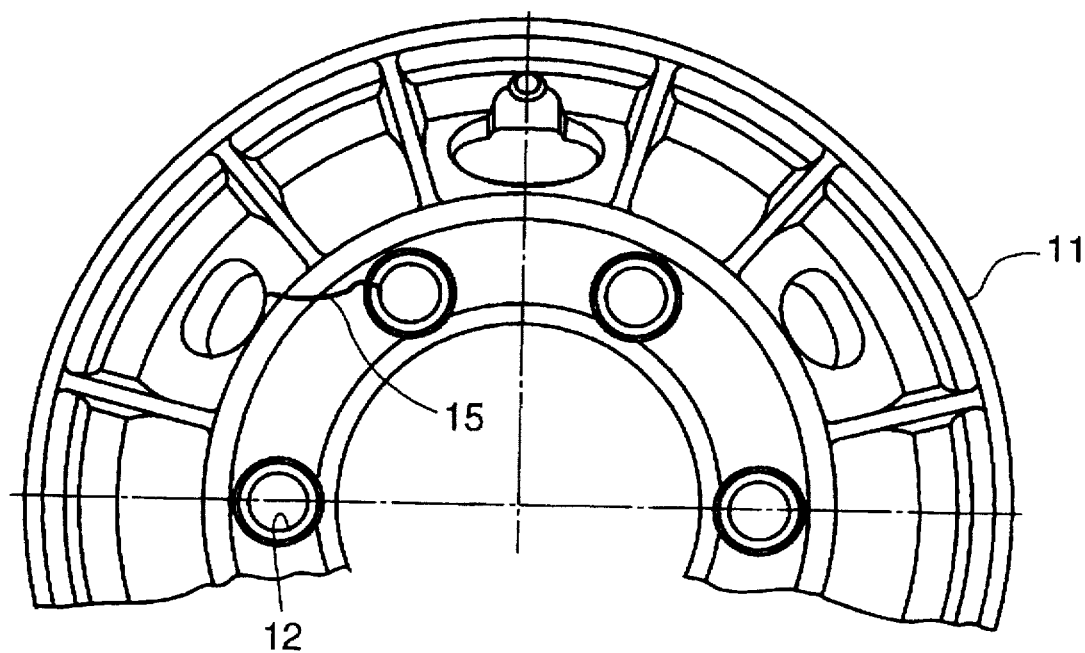
FIG. 5 is a front elevational view of an upper half portion of a cast wheel for a truck and/or a bus.
Figure 6:
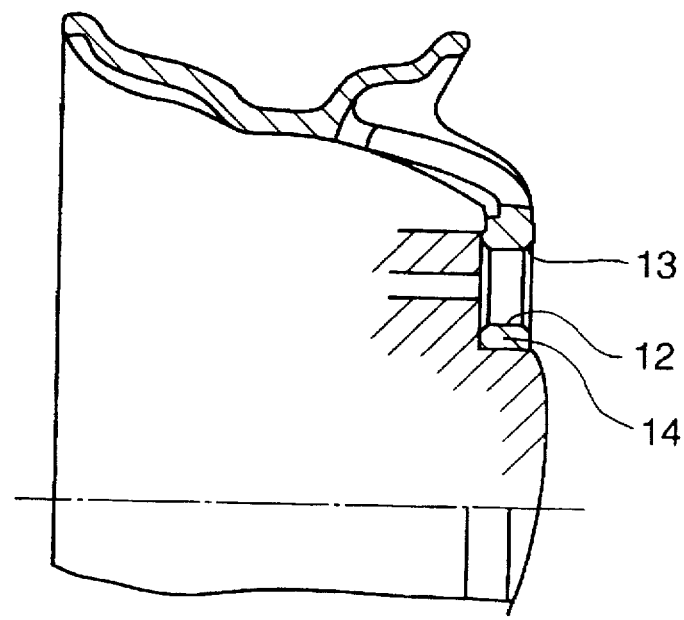
FIG. 6 is a cross-sectional view of the half portion of the cast wheel of FIG. 5.

As illustrated in FIGS. 5 and 6, a cast aluminum wheel 11 includes a plurality of boltholes and a plurality of nut seats 13. Each nut seat 13 is coaxial with respect to each bolthole 12 and is formed around an axis of each bolthole 12. The cast aluminum wheel 11 includes a hub coupling portion 14 where the wheel is coupled to a hub of a truck or a bus. In a conventional method of producing a cast aluminum wheel for a truck and/or a bus, a crack 15 is typically formed at the hub coupling portion 14 and propagates to a bolthole 12. This crack does not occur in a cast aluminum wheel for a sedan.

Figure 1:
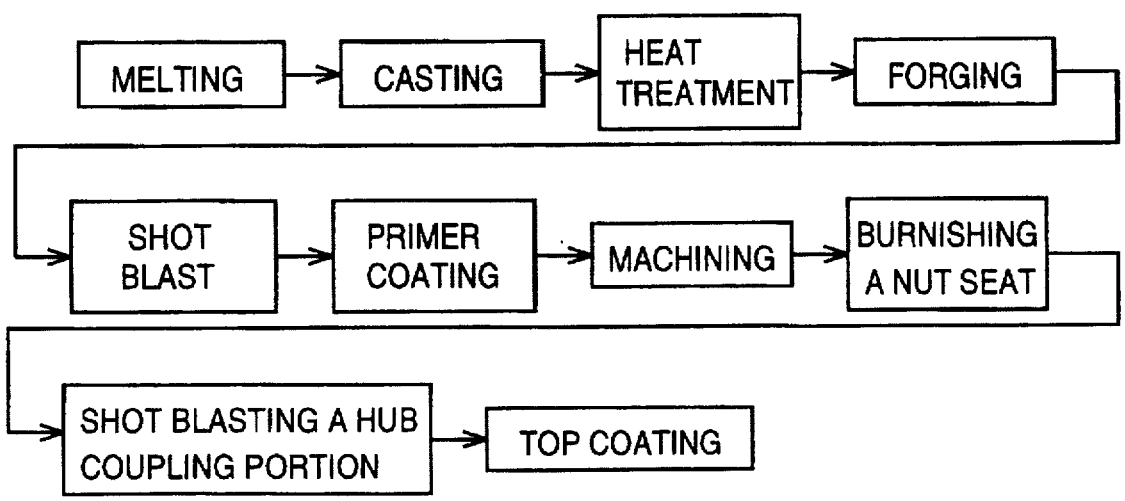
FIG. 1 is a block diagram illustrating the steps of a method for producing a cast wheel for a truck and for a bus according to an embodiment of the present invention.

As illustrated in FIG. 1, a method for producing a cast aluminum wheel according to an embodiment of the present invention includes the steps of melting aluminum (step 1), casting an aluminum wheel utilizing one of a high pressure, a low pressure, and gravity (step 2), heat treating the wheel (step 3), forging (step 4), shot blasting (step 5), coating a primer layer (step 6), machining a nut seat, etc. (step 7), burnishing the nut seat (step 8), shot blasting a hub coupling surface (step 9), and coating a top layer. The order of step 8 and step 9 may be reversed, and the order of step 4 and step 5 may be reversed.

The above-described wheel producing method is a method obtained by adding the three kinds of processes of forging, burnishing the nut seat, and shot blasting the hub coupling surface to the conventional method for producing a cast aluminum wheel for a sedan. The applicants have determined that the conventional method for casting an aluminum wheel for a sedan can be used as a method for casting an aluminum wheel for a truck and a bus by adding the three kinds of processes.

During forging, a hub coupling surface of the cast wheel between adjacent boltholes is forged by a press or roller so that a plastic strain of about 5–15% is afforded to the hub coupling surface. The reason for selecting the portion of the wheel between the boltholes to be forged is that usually a crack is formed at a portion of a cast wheel between adjacent boltholes, which propagates toward a bolthole. By forging, cast defects which may exist in the wheel are eliminated, so that a fatigue strength of the cast wheel is improved.

During burnishing, each nut seat is roller-burnished and is afforded a plastic strain of about 5–10%. By burnishing, defects which may exist at a surface of the nut seat are eliminated. At the same time, during the burnishing, the nut seat surface is work-hardened. Further, the nut seat surface is afforded a residual compressive stress, so that the fatigue strength of the nut seat and a portion around the nut seat where a crack tends to propagate increases. The reason why the residual compressive stress increases the fatigue strength is that the residual compressive stress annuls a portion of a tensile stress which is caused at the nut seat surface and tends to generate a crack.

During shot blasting the hub coupling surfaces, opposite surfaces (a front surface and a back surface) of the hub coupling portion including the nut seat surface, are shot-blasted. The shot blast work-hardens the hub coupling surfaces including the nut seat surface and causes a residual compressive stress at the surfaces to thereby increase the fatigue strength of the hub coupling surfaces where a crack tends to propagate.

Figure 2:
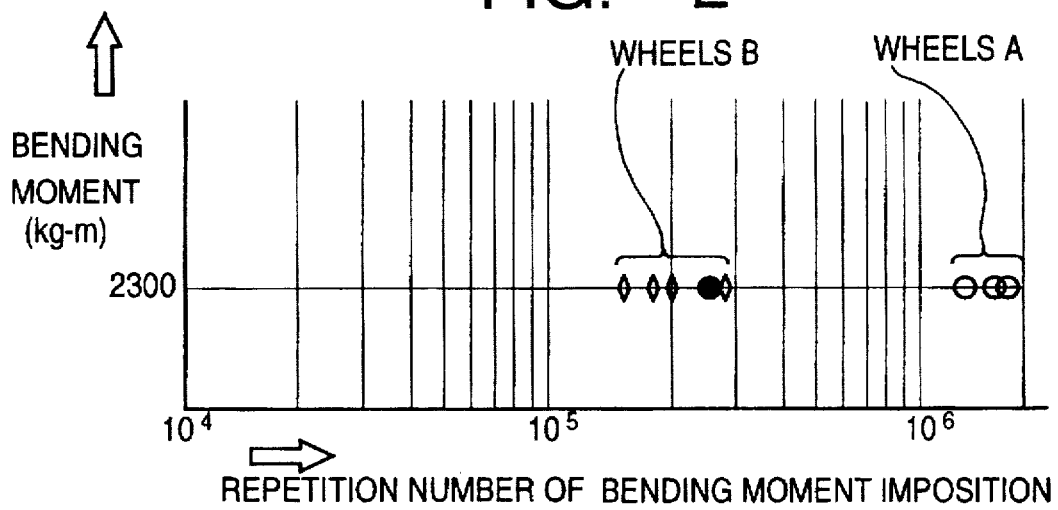
FIG. 2 is a graph illustrating results of a bending moment test (a life test) conducted to cast wheels produced according to the method of the present invention and cast wheels produced according to the conventional method for a sedan.
Figure 3:
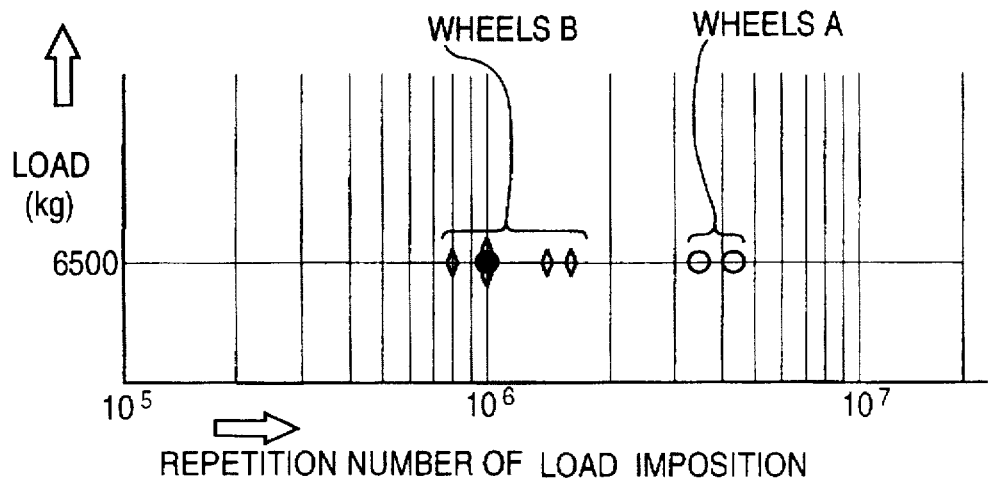
FIG. 3 is a graph illustrating results of a radial load test (a drum test) conducted to cast wheels produced according to the method of the present invention and cast wheels produced according to the conventional method for a sedan.

FIGS. 2 and 3 illustrate the results of a life test and a drum test of cast aluminum wheels for a truck and a bus produced according to the method of the present invention (wheels A) and cast aluminum wheels for a truck and a bus produced according to the conventional method for producing cast aluminum wheels for a sedan (wheels B) (which does not include the above-described three kinds of strengthening processes).

FIG. 2 illustrates the results of a bending moment test for a life test (according to the Japanese Industrial Standard) where a bending moment (230 kg·m) was repeatedly imposed on a workpiece of a wheel and the number of the imposition repetition of the bending moment when a crack exceeding a predetermined size was generated, was counted. The larger the number, the higher the fatigue strength of the wheel. As can be seen from FIG. 2, the fatigue strength of cast wheels for a truck and a bus produced according to the method of the present invention (wheels A) is about 7 to 9 times that of cast wheels for a truck and a bus produced according to the conventional method for a sedan (wheels B). Further, a deviation of fatigue strengths from the average fatigue strength with the cast wheels produced according to the method of the present invention is smaller than that with the wheels produced according to the conventional method for a sedan. The cast wheels produced according to the method of the present invention have a fatigue strength substantially equal to or greater than that of the conventional wheels for a truck and a bus produced by forging.

FIG. 3 illustrates the results of a radial load test or a drum test (according to the Japanese Industrial Standard) where a radial load (6500 kg) was repeatedly imposed on a workpiece of a wheel and the number of the imposition repetition of the radial load when a crack exceeding a predetermined size was generated, was counted. The larger the number, the higher the fatigue strength of the wheel. As can be seen from FIG. 3, an average fatigue strength of cast wheels for a truck and a bus produced according to the method of the present invention (wheels A) is about 3.5 to 4.5 times that of cast wheels for truck and a bus produced according to the conventional method for a sedan (wheels B). Further, a deviation of fatigue strength from the average fatigue strength with the cast wheels produced according to the method of the present invention is smaller than that with the wheels produced according to the conventional method for a sedan. The cast wheels produced according to the method of the present invention have a fatigue strength substantially equal to or greater than that of the conventional wheels for a truck and a bus produced by forging.

Figure 4:
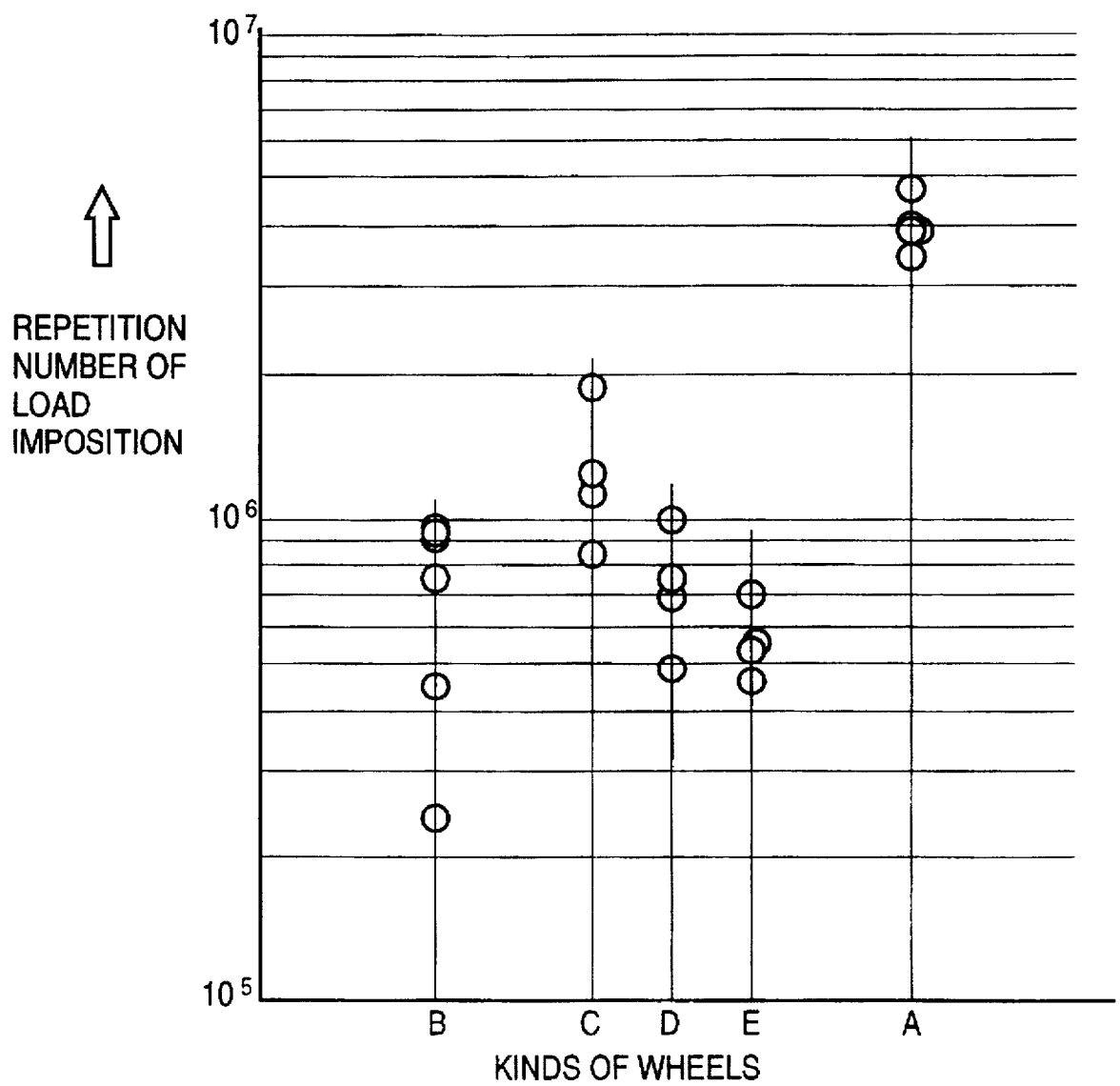
FIG. 4 is a graph illustrating results of a drum test conducted to cast wheels produced according to the method of the present invention, cast wheels produced according to the conventional method for a sedan, and cast wheels produced according to the conventional method for a sedan and then processed according to only one strengthening processes selected from three strengthening processes.

FIG. 4 illustrates the results of a drum test conducted to cast aluminum wheels A for a truck and a bus produced according to the method of the present invention (that includes all of the above-described three strengthening processes), cast aluminum wheels B for a truck and a bus produced according to the conventional method for a sedan (that does not include any of the three strengthening processes), and cast aluminum wheels C, D, and E for a truck and a bus produced according to the conventional method for a sedan and then processed according to only one strengthening processes selected from the three strengthening processes discussed above. The number at which a crack was generated was about $5 \times 10^5$ with wheels B, about $12 \times 10^5$ with wheels C where burnishing was selected and processed (increased by $7 \times 10^5$ compared with wheels B), about $7 \times 10^5$ with wheels D where shot blast was selected and processed (increased by $2 \times 10^5$ compared with wheels B), about $6 \times 10^5$ with wheels E where forging was selected and processed (increased by $1 \times 10^5$ compared with wheels B), and about $40 \times 10^5$ with wheels A produced according to the method of the present invention (increased by $35 \times 10^5$ compared with wheels B). The increment in number, $35 \times 10^5$ with wheels A produced according to the method of the present invention is greater than a summation, $10 \times 10^5$ of the increment, $7 \times 10^5$ with the burnishing processed wheels C, $2 \times 10^5$ with the shot blast processed wheels D, and $1 \times 10^5$ with the forging processed wheels E. This means that a synergism is generated in the fatigue strength of wheels A by applying all of the three strengthening processes to wheels B. Further, as also can be seen from FIG. 4, a rate of deviation (from an average thereof) of the fatigue strengths of wheels A produced according to the method of the present invention is smaller than those of wheels B, C, D, and E. This means that the rate of deviation of fatigue strengths also becomes small by applying all of the three strengthening processes and reliability with respect to the fatigue strength becomes high.

According to the present invention, the following advantages are obtained.

Because all of the three strengthening processes that include forging a portion of the cast aluminum wheel between adjacent boltholes, shot blasting a hub coupling surface of the cast wheel, and burnishing a nut seat of the cast wheel are applied to the cast wheel in any order, the fatigue strength of the cast aluminum wheel for a truck and a bus is increased to satisfy the fatigue strength standard (the standard for an aluminum wheel for a truck and a bus produced by forging). Therefore, the thus produced cast aluminum wheel can be used practically as a wheel for a truck and a bus.

Because casting can be used for producing an aluminum wheel for a truck and a bus, the freedom of design increases compared with a forging, and a decrease in cost is also possible.

Although the present invention has been described with reference to a specific exemplary embodiment, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A method for producing a cast aluminum wheel for a vehicle comprising the steps of:

casting an aluminum wheel, said aluminum wheel including a hub coupling portion, a plurality of boltholes defined by said aluminum wheel, and a plurality of nut seats constructed and arranged such that each one of said plurality of boltholes has a nut seat formed therearound; and applying at least three kinds of strengthening processes to said aluminum wheel to thereby increase the fatigue strength of said aluminum wheel, including forging said hub coupling portion of said aluminum wheel between adjacent boltholes, shot blasting a hub coupling surface of said hub coupling portion, and burnishing each said nut seat wheel.

2. A method according to claim 1, wherein said forging, said burnishing, and said shot blasting are conducted in the order of forging, burnishing, and shot blasting.

3. A method according to claim 1, wherein said hub coupling surface between adjacent said boltholes is afforded a plastic strain of about 5–15% during said forging.

4. A method according to claim 1, wherein said burnishing is roller burnishing.

5. A method according to claim 4, wherein each said nut seat is afforded a plastic strain of about 5–10% during said roller burnishing.

6. A method according to claim 1, wherein said shot blasting is applied to both of opposite surfaces of said hub coupling portion.

7. A method according to claim 6, wherein said shot blasting is applied also to each said nut seat.

\* \* \* \* \*